United States Patent [19]

Scarati et al.

[11] Patent Number: 4,842,939

[45] Date of Patent: Jun. 27, 1989

[54] PROCESS FOR PROTECTING AND LUBRICATING SURFACES SUBJECTED TO FRICTION AND WEAR

[76] Inventors: Mario A. Scarati, 20, via Bronzino, 20133 Milan; Alberto Re, 40, via Lamarmora, 20122 Milan; Carlo Tognoni, 4/c, via Pastorelli, 20143 Milan; Piero Gavezotti, 9, via Cimabue, 20148 Milan, all of Italy

[21] Appl. No.: 925,704

[22] Filed: Oct. 30, 1986

[30] Foreign Application Priority Data

Oct. 30, 1985 [IT] Italy ................................ 22669 A/85

[51] Int. Cl.$^4$ ............................................. G11B 5/70
[52] U.S. Cl. ..................................... 428/421; 427/131; 428/422; 428/425.9; 428/694; 428/695; 428/900
[58] Field of Search ..................... 428/425.9, 422, 421, 428/695, ; 427/131

[56] References Cited

U.S. PATENT DOCUMENTS 3,242,218  3/1966  Miller ................................ 428/422
3,665,041  5/1972  Sianesi ............................... 568/385
3,715,378  2/1973  Sianesi et al. ...................... 428/422
3,810,874  5/1974  Mitsch ................................ 528/70
3,847,978  11/1974  Sianesi .............................. 524/366
3,972,856  8/1976  Mitsch ................................ 528/70
4,267,238  5/1981  Chernega .......................... 428/900
4,268,556  5/1981  Pedrotty ........................... 428/422
4,321,404  3/1982  Williams ............................ 427/146
4,523,039  1/1985  Laqow ............................... 568/615
4,526,833  7/1985  Burguette ......................... 428/421
4,526,836  7/1985  Mukai ................................ 428/422
4,529,659  7/1985  Hoshino ............................ 428/422

FOREIGN PATENT DOCUMENTS 165649  12/1985  European Pat. Off. .
165650  12/1985  European Pat. Off. .
0192190  8/1986  European Pat. Off. ............. 528/70

Primary Examiner—Paul J. Thibodeau

[57] ABSTRACT

Process for the protection and lubrication of surfaces subjected to friction and wear in magnetic recording media, by application of a coating of a polyurethane containing polyoxyfluoroalkylene blocks.

20 Claims, No Drawings

PROCESS FOR PROTECTING AND LUBRICATING SURFACES SUBJECTED TO FRICTION AND WEAR

BACKGROUND OF THE INVENTION

1. Field of the Invention

The present invention relates to a process for the protection and lubrication of surfaces subjected to friction and wear, such as for instance magnetic recording media and accessories, including magnetic tape cassettes, by applying a protective coating comprising a fluorinated polyurethane.

More particularly, the present invention relates to the use of polyurethane resins containing polyoxyfluoroalkylene blocks to obtain coatings that protect such surfaces from friction and wear, when said surfaces are subjected to sliding, rolling, transverse forces or normal forces, or to movement involving either continuous or repetitive intermittent contact with other surfaces of a similar or different nature.

Such friction problems occur in any device that employs magnetic recording media, and in particular, in audio and video cassettes or recording discs.

2. Description of the Prior Art

In order to minimize the drawbacks resulting from friction and wear, it is known to use neutral perfluoropolyethers as lubricants for the surfaces of magnetic discs and tapes for audio and video recordings.

Perfluoropolyethers suitable for this purpose have been sold under the trademarks "FOMBLIN" (Montedison) and "KRYTOX" (duPont), and they are described, for instance, in U.S. Pat. Nos. 3,242,218, 3,665,041 and 3,715,378. However, these perfluoropolyethers do not provide long-term protection because of insufficient adhesion to the substrate (carrier surface).

Some improvements in the lubricating properties of perfluoropolyethers have been achieved as described in U.S. Pat. Nos. 4,268,556 and 4,267,238, by introducing into the perfluoropolyether chain polar and chemically reactive end groups such as —CH$_2$OH, —COOR, —CONH—R and —CO—CF$_3$ in the thought that these would provide improved adhesion of the perfluoropolyether compound to the surface to be lubricated. However, the improvement in adhesion is frequently unsatisfactory, and will depend upon the particular substrate onto which the perfluoropolyether products are applied. In the case of polymeric substrates or metal oxide particles dispersed in polymeric matrixes, these lubricants have not been sufficiently compatible with the substrates, so that their adhesion and resulting protective action was of short-term duration.

Furthermore, such modified perfluoropolyethers exhibit the disadvantage of a high reactivity of the end groups, some of which, for instance, easily hydrolyze to form acid groups which react with the materials on which they are deposited, thereby adversely altering the properties of said materials.

As regards manufactured articles containing members subjected to friction and wear, coatings made of polytetrafluoroethylene (PTFE) are also known. The PTFE protective layers, although quite wear-resistant, exhibit drawbacks both with regard to the particular surface to be protected, since PTFE layers are of only limited flexibilty, as well as regards the type of application technique that can be used for said protective layer. Indeed, since the PTFE is insoluble in organic solvents, it must be applied as a polymer dispersion. By such technique, however, it is impossible to obtain sufficiently thin, homogeneous layers of polymer. Thick layers create problems, for instance, a lower signal level due to the increased distance between the reading-/recording head and the magnetic tape.

European published application Nos. 165,649 and 165,650 describe the use of fluoropolyethers containing special end groups suitable for improving adhesion of the coating to the surface of the substrate.

Such fluoropolyethers exhibit good lubricating properties and may be conveniently used in the lubrication of both magnetic recording media as well as for accessories of audio and video recording cassettes. The best results with said fluoropolyethers are, however, primarily achieved only when applied to metal surfaces.

Thus, there has been a need for a process which is useful for the protection of surfaces of either a polymeric or metallic nature, these surfaces being subjected to friction and wear, by a protective coating capable of providing long-lasting protection and lubrication of said surfaces.

Likewise, it is desirable that the protective coating be capable of being spread onto the surface to be protected both in the form of very thin layers, in the range of 50–1,000 Å, so that there will be no alteration in the response signal of the magnetic media, as well as in the form of thicker layers, in the range of 1,000–50,000 Å, for accessory members where no signal response problems exist.

SUMMARY OF THE INVENTION

It has now surprisingly been found that it is possible to overcome the above drawbacks by applying a fluorinated polymer comprising polyoxyfluoroalkylene groups onto surfaces subjected to friction and wear.

More particularly, according to the present invention, fluorinated polyurethane polymers are used to effect the coating. These polymers have a block structure and contain repeating fluoropolyoxyalkylene units chosen from the following classes:

(I) (C$_2$F$_4$O) and perhaps eventually (CF$_2$O), said units being randomly distributed along the fluoropolyoxyalkylene chain;

(II) (C$_3$F$_6$O) and perhaps eventually (C$_2$F$_4$O) and/or (CFXO) wherein X=F or —CF$_3$, said units being randomly distributed along the fluoropolyoxalkylene chain;

(III) —CH$_2$—CF$_2$—CF$_2$—O—;

(IV) —CF$_2$—CF$_2$—CF$_2$—O—; or

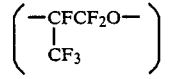 (V)

DETAILED DESCRIPTION OF THE INVENTION

More specifically, the fluoropolyoxyalkylene units of the polymers used in the present invention, are the following:

(I) (C$_2$F$_4$O) (CF$_2$O); or (C$_2$F$_4$O);

(II) (C$_3$F$_6$O) (C$_2$F$_4$O) (CFXO) wherein X is —F or —CF$_3$; or (C$_3$F$_6$O); or (C$_3$F$_6$);

(III) $-CH_2-CF_2-CF_2-O$; said units said units being linked to one another as shown by the following structural formula: $-(O-CF_2-CF_2-CH_2)_p-O-R'_f-O-(CH_2-CF_2-CF_2O)_q-$ wherein $R'_f$ is a fluoroalkylene group, p and q are integers from 0 to 200 and p+q is at least 1:

(IV) $-CF_2-CF_2-CF_2-O-$; or

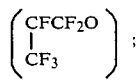 (V)

said units being linked to one another as shown in the following formula:

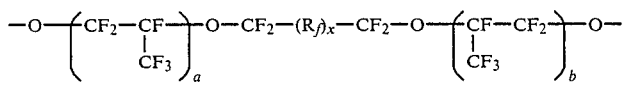

wherein $R_f$ is a fluoroalkylene group, x is 0 or 1, a and b are intergers, with a+b being at least 1.

More particularly, the fluorinated polyurethanes which may be employed in the present invention contain the following components:

(a) Fluorinated diisocyanates containing fluoropolyoxyalkylene units chosen from amongst the units of Classes I, II, III, IV and V said fluorinated diisocyanates preferably having an average molecular weight of form about 500 to 7000.

Fluorinated diisocyanates belonging to Class I are specifically chosen from amongst those comprised of the general formula:

$$OCN-R-(Z)_d-CF_2O(C_2F_4O)_m-(CF_2O)_n-CF_2-(Z)_d-R-NCO$$

wherein d=0 or 1; m and n are positive integers such that the resulting average molecular weight falls within the range indicated above;

wherein the units ($CF_2O$) and ($C_2F_4O$) are randomly distributed along the chain;

wherein Z is a linking bivalent radical, for example:

$-CONH-$; $-CH_2-$; $-CH_2O-$; $-CH_2OCH_2-$; $-CH_2OSO_2-$;

and wherein R is a bivalent aliphatic radical having from 1 to 12 carbon atoms, a bivalent cycloaliphatic radical, or bivalent aromatic radical. More particularly, R may be:

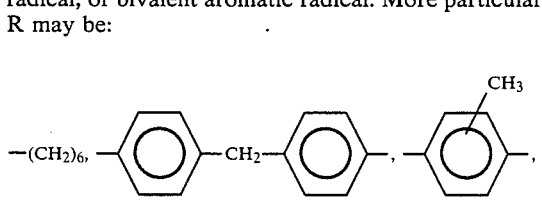

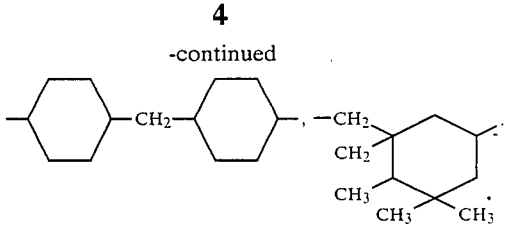

The above fluoropolyoxyalkylene isocyanates may be obtained by known methods, for instance, by those described in U.S. Pat. No. 3,810,874.

Fluorinated diisocyanates of Class I, when containing only units ($CF_2CF_2O$), can be prepared according to U.S. Pat. No. 4,523,039, wherein the functional end groups —COF may be introduced by the method described in Italian Patent Application No. 22920 A/85 and subsequently converted to —NCO groups as described in U.S. Pat. Nos. 3,847,978 and 3,810,874.

Fluorinated diisocyanates of Class II are particularly chosen from amongst compounds that may be respesented by the following general formula:

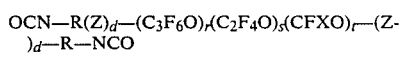

wherein X=—F or —$CF_3$; d, Z and R have the same meaning as previously given, and r, s, and t are positive integers such that the resulting average molecular weight falls within the above indicated range, and wherein the ($C_3F_6O$), ($C_2F_4O$) and (CFXO) units are randomly distributed along the chain. Said compounds are obtainable by photooxidation of mixtures of $C_3F_6$ and $C_2F_4$, as described in U.S. Pat. No. 3,665,041, and by the subsequent conversion of the —COF end groups to —NCO end groups. This conversion can be carried out by the known methods as described in U.S. Pat. Nos. 3,847,987 and 3,810,874.

Fluorinated diisocyanates of Class III are particularly chosen from amongst compounds that may be represented by the following general formula:

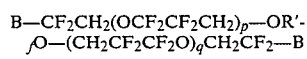

wherein p, q and $R'_f$ have the previously stated meaning and are described in published European Application EP No. 148,482, wherein the B groups contain —COF end groups which may be converted to —NCO end groups as described in U.S. Pat. Nos. 3,847,987 and 3,810,874.

Fluorinated diisocyanates of Class IV can be prepared according to EP No. 148,482, wherein the functional end groups —COF may be introduced by the method described in Italian Patent Application No. 22920 A/85 and successively converted to —NCO groups as described in U.S. Pat. Nos. 3,847,978 and 3,810,874.

Fluorinated diisocyanates of Class V are particularly chosen from amongst compounds that may be represented by the following general formula:

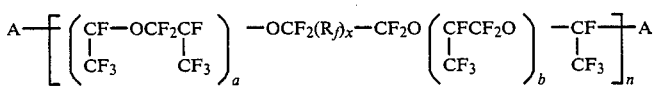

wherein A is a radical containing an —NCO end group, for instance, —CH$_2$NCO; a, b, x and R$_f$ have the previously stated meaning, and n is an integer equal to or greater than 1. Said compounds are described in published European Application EP No. 151,877.

(b) Non-fluorinate diisocyanates, such as, for instance, those represented by the following general formula:

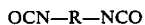

wherein R is an organic bivalent radical such as those previously described.

(c) Fluorinated or non-fluorinated diols, containing one or more aromatic or cycloaliphatic polycyclic rings, such as, for instance:

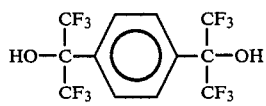

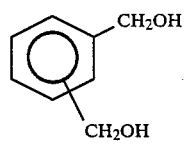

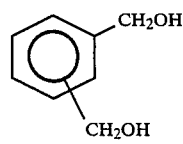

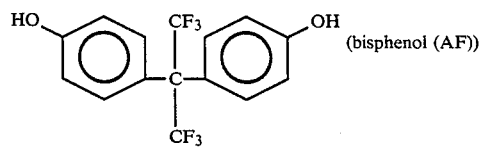

(d) Polyoxyfluoroalkylenes having —CH$_2$—OH end groups, chosen from amongst Classes I, II, III, IV or V and preferably having and average molecular weight of from about 400 to 7000.

Fluoropolyoxyalkylene diols belong to Class I are particularly chosen from amongst those of the following formula:

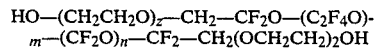

wherein z is an integer from 0 to 3, and m and n are positive integers, such that the average molecular weight is within the above indicated range. As fluorinated diols one may also use compounds having a fluoropolyoxyalkylene chain of the above type, and terminals of the following type: —CONHR'(CH$_2$)$_v$OH, wherein R' is H or alkyl and v is from 1 to 6.

These fluoropolyoxyalkylene diols may be obtained by known methods, for instance, as described in U.S. Pat. No. 3,810,874.

Fluorinated diols of Class I, when containing only units (CF$_2$CF$_2$O), can be prepared according to U.S. Pat. No. 4,523,039, wherein the functional end groups —COF may be introduced by the method described in Italian Patent Application No. 22920 A/85 and subsequently converted to —OH groups as described in U.S. Pat. Nos. 3,847,978 and 3,810,874.

Fluorinated diols belonging to Class II are particularly chosen from amongst compounds that may be represented by the following formula:

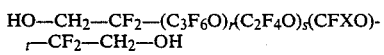

wherein x=—F or —CF$_3$; and r, s and t are positive integers such that the average molecular weight is as previously defined.

Said compounds may be obtained by photo-oxidation of mixtures of C$_3$F$_6$ and C$_2$F$_4$, as described in U.S. Pat. No. 3,665,041, followed by conversion of the —COF end groups so as to obtain terminal —OH groups, by known methods as described in U.S. Pat. Nos. 3,847,978 and 3,810,874.

Flourinated diols belonging to Class III are particularly chosen from amongst compounds of the general formula:

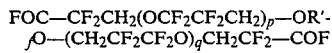

wherein p, q and R'$_f$ have the meaning previously given; said compounds are described in published European Patent EP No. 148,482, in which the —COF end groups are converted so as to obtain —OH terminal groups as described in U.S. Pat. Nos. 3,847,978 and 3,810,874.

Fluorinated diols of Class IV can be prepared according to EP No. 148,482, wherein the functional end groups —COF may be introduced by the method described in Italian Patent Application No. 22920 A/85 and successively converted to —OH groups as described in U.S. Pat. Nos. 3,847,978 and 3,810,874.

Fluorinated diols belonging to Class V are particularly chosen from amongst compounds comprised by the following general formula:

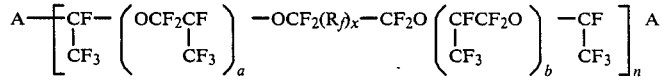

wherein A is a radical containing a terminal —OH group, for instance, —CH$_2$OH, with a, b, n, R$_f$ and x having the meanings previously set out. Said compounds are described in published European Patent Application EP No. 151,877.

(e) Non-fluorinated diols of the general formula HO—R—OH, wherein R has the previously indicated meaning. Polyurethanes which may be used according to the present invention are described, for instance, in Italian Pat. No. 903,446 and Italian Pat. Appln. No. 19497 A/85.

As crosslinking agents for the fluorinated polyurethanes used in the present invention, there may be used polyfunctional compounds of the following type:

(f$_2$) Trihydroxy- or tetrahydroxypolyoxyfluoroalkylenes having a fluoropolyoxyalklene chain of the type indicated in (d) above, and having one or both of the terminal groups of the type:

—CH$_2$O—CH$_2$CH(OH)—CH$_2$OH,
—CO—N(CH$_2$CH$_2$OH)$_2$.

If only one terminal group is of the foregoing type, the other end group is a mono-hydroxylated group of the type indicated in (d).

These may be obtained by known methods, for instance, by those described in Italian Pat. No. 903,446.

(f$_2$) Tri- or tetrahydroxy compounds such as, for example, trimethylolpropane, 1,2,6-hexanetriol; N,N'-tetrahydroxyethylendiamine of the formula:

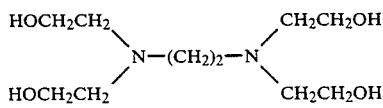

or fluorinated polyhydroxy compounds such as, for example:

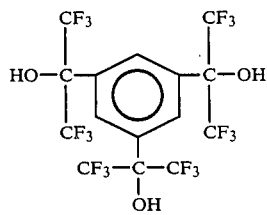

(g) Polyisocyanates such as trimers or polymers of the isocyanates described in (d) above, such as, for example, trimers of hexamethylendiisocyanate or of toluenediisocyante.

Crosslinking agents of the polyol type, such as those described in (f) and (f$_2$) above, are used when the polymers to be crosslinked contain isocyanate end groups. On the other hand, when the polymers to be crosslinked contain hydroxylated end groups, one may use as crosslinking agents polyisocyanates such as those described in (g) above.

The polyurethanes used in the present invention are obtained, as described in detail hereinafter, by combining the various components (a), (b), (c), (d) and (e), optionally crosslinked with suitable crosslinking agents of either the (f) or (g) type, provided that at least one of the components of the polyurethane contains fluoropolyoxyalkylene units of the type previously indicated.

Polyurethanes suitable for the present invention may be prepared by a two-step process, initially mixing together the bi-functional diisocyanate components with the di-hydroxylated compounds in a molar ratio of 1:1, or in the presence of an excess of either one of the two components. The mixture is then reacted at from about 20° to 100° C. in order to extend the length of the macromolecular chain. There is thereby obtained a stable prepolymer which may, if desired, subsequently be converted to the final product by the addition of the polyfunctional component (crosslinking agent).

The crosslinking agent will be a polyol of type (f) if the prepolymer contains predominantly isocyanate terminal groups, said polymer having been obtained by reacting the diol components with an excess of isocyanate compound; the crosslinking agent will be polyisocyanate of type (g) when the prepolymer primarily contains hydroxyl terminal groups, said prepolymer having been obtained by the reaction of a diisocyanate with an excess of dihydroxy compound.

If one operates with a molar ratio of 1:1, linear polymers are obtained, which may be used as is, without the addition of crosslinking agents.

However, where corosslinked polymers are desired, a slight excess of one of the two reactants must be added, and then crosslinking is carried out by means of a suitable crosslinking agent as previously described. One can thereby obtain a prepolymer having a very high molecular weight.

The addition of an effective catalyst system enables one to operate at low temperatures (e.g., 20° to 60° C.) and with short times. Moreover, appropriate introduction of the catalyst will premit one to optimize the pot-life, that is, the time period during which the reaction mixture remains sufficiently fluid.

As catalysts one may use organo-tin compounds, such as, e.g., dibutyltin dilaurate, dibutyltin diacetate, dibutyltin oxide; iron (Fe) derivatives, such as ferroacetylacetonate; titanium alcoholates such as titanium tetraisopropylate; tertiary amines such as triethylamine. The amount of catalyst utilized is generally from about 0.001% to 2% by weight based on the total weight of the reactants, and preferably from about 0.01% to 0.5%.

A preferred method of applying the polymers thus prepared to the substrate comprises preparing two separate solutions, one solution containing the prepolymer with the isocyanate or hydroxyl end groups, prepared as previously described, in a suitable solvent such as, for instance, a mixture of 1,1,2-trichloro-1,2,2-trifluoroethane [sometimes referred to as 1,1,2-trichlorotrifluoroethane] and acetone (in a ratio of 90:10); the second solution containing a suitable crosslinking agent in a suitable solvent such as, for instance, acetone. The desired viscosity for each solution, even a very low viscosity, can be obtained by appropriate dispensing of the various components.

The protective coating is obtained by successively immersing the substrate in the prepolymer solution, and thereafter in the crosslinking agent solution, each prepared as discribed above, or by application of the protective coating onto the substrate by techniques such as brushing or the like. In either case, this is followed by solvent evaporation and final heat treatment at a temperature of from about 20° to 150° C., and preferably from about 50° to 120° C.

By an alternative process, a bifunctional hydroxy prepolymer is reacted with an excess of isocyanate, thereby obtaining a prepolymer with isocyanate terminals, and the prepolymer is then crosslinked by a tertiary amine trimerization catalyst, e.g., triethylamine or N-methyl-morpholine, or an alkaline metal alkoxide, or the like. In this case, the coating is carried out by immersion of the substrate into a single solution containing the prepolymer having isocyanate terminal groups and the trimerization catalyst in a suitable solvent such as, for example, a 90/10 mixture of 1,1,2-trichlorotrifluoroethane/acetone.

After the solvent has been evaporated, a heat treatment is carried out at temperatures of from about 100° to 150° C., in order to effect crosslinking.

As a result of the above coating processes one obtains self-lubricating protective coatings having the desired thickness, even extremely low thicknesses of the order of 50–1,000 Å. However, if greater thickness are desired, of the order of 1,000–50,000 Å, one then uses more concentrated starting solutions.

The thus applied polymeric films are characterized by the following physical parameters:
frictional coefficient;
contact angle;
wearing test;
stiction test after an extended storage period.

These are described in detail in the following illustrative examples.

Fluorinated polyurethanes as protective coatings are particularly suitable for magnetic media surfaces, accessory surfaces, slides, and guides made of metal or sintered alloys. More particularly, in the field of magnetic media, the most suitable substrates are those comprising a polymeric matrix or continuous metal layers.

It is well known that magnetic media generally comprise a layer disposed over a substrate made of flexible plastic material or of rigid metal material. Said magnetic layer generally consists of magnetic oxide particles, such as, for example, $Fe_2O_3$, Ba ferrite, or metal particles such as Fe, finely dispersed in a thermoplastic or thermosetting polymer, for instance, of the polyvinyl, polyurethane or epoxy type.

In other cases, there is deposited a continuous magnetic metal layer, which may be a Co/P or Co-Ni/P alloy, or in the case of recording works in a normal direction, a layer of Co/Cr alloy, on a rigid or flexible substrate by using evaporation under vacuum or sputtering techniques.

As regards magnetic tapes and discs, flexible or rigid, polyurethane films of the present invention may be applied both onto the face of the magnetic medium which comes into contact with the reading/recording head, thus serving both as a lubricating agent and as a protective agent for the magnetic medium, as well as a "back-coating," e.g., a coating of the inner part which comes more easily into contact with the accessory driving or dragging members; in this latter case it acts primarily as a lubricant.

Surfaces which may conveniently be coated with the polyurethane layer of this invention are, for example, those made of synthetic polymers, including polymers of the elastomeric type. The synthetic polymers include, e.g., polyamides, polyimides, polyethers, polyetherketones, aromatic polyethersulphones, polysulphones, polycarbonates, polyacetals, etc.

The polyurethane compounds used for the present invention are also useful as coatings for manufactured articles based on technopolymers (engineering plastics), subjected to motion and in contact with other surfaces such as slides or resting surfaces.

In the latter case, thicker layers of polyurethanes are applied, generally from about 1,000 to 50,000 Å, depending on the nature of the surface onto which they are to be applied.

It has now been found that the protection due to a continuous polyurethane layer advantageously permits one to obtain solid self-lubricating layers; moreover such protection is longer lasting than that attainable by products known in the prior art.

The following examples are given for illustrative purposes only, and are not to be considered to be by way of limitation.

EXAMPLE 1

Preparation Of Fluorinated Polyurethanes

Into a three-necked flask of 250 cc capacity were loaded 14.45 g of AF bisphenol corresponding to 80 milliequivalents [Equivalent Weight (E.W.)=168.12], 77.22 g (corresponding to 43 meq.) of α, W-bis(tolylisocyanate)polyoxyperfluoroalkylene (indicated in this specification as "Z DISOC") (E.W.1797.3), and 0.32 ml of a 0.2M solution of dibutyltindiacetate in acetone (0.1 mole percent of catalyst based on the total mols of the reactants).

The flask was then immersed in an oil bath maintained at a temperature of 50° C. The reaction was carried out for three hours, under stirring and in a nitrogen atmosphere, periodically applying a vacuum in order to de-aerate the reaction mass.

The thus obtained prepolymer was used for preparing the solution necessary for obtaining the coatings for the magnetic media in accordance with the present invention.

Solution A: Prepolymer in 1,1,2-trichlorotrifluoroethane ("Delifrene")/acetone, having a 90:10 ratio, in an amount equal to 21.07 g (9.86 meg) in 1 liter of solution;

Solution B: Desmodur®N 100 in acetone, in an amount of 1.91 g (9.86 meq) per liter of solution;

Ration meq A/meq B=1.00.

When the two solutions are mixed together in that ratio, one obtains a final solution 1% by weight (10 g/liter). In order to prepare the solutions, anhydrous and distilled solvents were used.

EXAMPLE 2

Into a three-necked 250 cc flask were charged 14.565 g of α, W-bis(dihydroxymethyl)polyoxyperfluoroalkylene-ethylene derivative (E.W. 1012,5; 14.38 meq), 0.11 ml of a 0.2M solution in anhydrous acetone of dibutyltin-diacetate (0.1% of the total mols of the reactants) as catalyst for the prepolymerization, and 0.92 ml of a 0.31 solution in anhydrous ethanol of potassium acetate (2% of the mols of isocyanate to be added) which catalyzes the subsequent crosslinking reaction by means of trimerization of the free isocyanate groups.

The flask was then immersed in an oil bath maintained at a temperature of 50° C. and then, under mechanical stirring, the solvents were evaporated under vacuum.

There were then added 35.435 g of Z DISOC (E.W.1231.6; 28.76 meq) and the reaction was carried out for 3 hours at 50° C., under mechanical stirring and a nitrogen blanket, applying a vacuum towards the end of the reaction in order to de-aerate (degasify) the reaction mass.

15.6 g of the resulting prepolymer were then dissolved in 990 ml of "Delifrene," thereby obtaining a final solution of 1% by weight (10 g-liter).

EXAMPLE 3

COATING TESTS

In this test rigid "oxide-coated" discs were used.

The magnetic layer to be protected from wear was a dispersion of acicular particles of $Fe_2O_3$ in an epoxy polymer binder.

Normally, neutral perfluoropolyether fluids that have been utilized as surface lubricants, in layers 50–100 Å thick, are not stable when centrifuged over long periods of time (e.g., of the order of a hunderd hours).

In this example the application of the fluorinated coating layer was carried out using the two solutions A and B of Example 1, mixed together at the moment of the application, by means of dip-coating at an extraction rate of 1.5 mm/sec., so as to obtain, after crosslinking, a polymer layer 80 Å thick.

The thus treated disc was then subjected to a thermal treatment (baking) at a temperature of 100° C., for varying periods of time.

The mechanical surface characteristics (friction) were determined by evaluating the tangential stress or force necessary for causing the detachment and the starting of a loaded head, after a fixed period of storage (at 20° C., 85% relative humidity for 10 hours). This force or stress, usually called "STICTION," must be as low as possible in order to avoid damage to the head-carrying system during the starting operation of a rigid disc memory.

For comparative purposes, there are shown below the values obtained with a coating layer obtained using Z DISOC, in 1,1,2-trichlorotrifluoroethane, in the presence of a polymerization catalyst and operating at a baking temperature of about 120° C.

TABLE 1

Test 1: Overcoat (i.e., coating layer): Z DISOC-thickness: 80Å;
5.25" Winchester disc-reading/recording head: MnZn ferrite, 10 g load;
baking temperature: 120° C.

| Baking time (hrs.) | Stiction force |
|---|---|
| 1 | 5.0 |
| 2 | 4.2 |
| 4 | 3.5 |
| 8 | 3.8 |

Test 2: Overcoat: prepolymer -thickness: 80 Å;
Composition: see Example 1;
5.25" Winchester disc-reading-recording head: MnZn ferrite -10 g load;
Baking temperature: 100° C.

| Baking time (hrs) | Stiction force |
|---|---|
| 1 | 0.25 |
| 2 | 0.20 |
| 4 | 0.15 |
| 8 | 0.15 |

The superior results obtained by the process of this invention are apparent from a comparison of Test 2 with Test 1. The stiction forces in Test 2 are markedly lower than in Test 1.

EXAMPLE 4

The protection against wear that is possible using coating layers of fluorinated polyurethanes was assessed, again for rigid oxide-coated Winchester discs, by means of start-and-stop tests.

In this test the memory unit was not used under normal or standard conditions in which, once the standard rotary speed of the disc is reached, the reading/recording head will be detached by about 0.3–0.5μ, due to the aerodynamical lift from the surface of the disc, and there is virtually no wear whatsoever. Instead, the memory unit was subjected to repeated start/stop cycles, where the sliding of the heads induces a degrading of the magnetic surface and finally leads to actual abrasion of the magnetic surface. Thus, the purpose of the fluorinated polyurethane-based protective polymeric layers is to reduce to a minimum the wear induced under these conditions.

The duration (or life) of the magnetic medium is expressed by the number of start-and-stop operations that can be carried out before there either occurs a 10% drop in the reproduced signal or an unacceptable quantity of dropouts (loss of information).

In general, the wear at the end of the test results in complete abrasion of the magnetic layer so as to reveal the underlying substrate.

The discs were coated using a composite polymer as specified in Example 2, or by using a solution of Z DISOC, obtained as described in Example 4.

TABLE 2

Start-and-Stop Test

Test 1: Overcoat: Z DISOC-thickness: 80Å
Baking temperature: 120° C.

| Baking time (hrs) | Continuous start/stop Number of cycles |
|---|---|
| 1 | 10,100 |
| 2 | 15,600 |
| 4 | 15,500 |
| 8 | 12,800 |
| 16 | 15,100 |

Test 2: Overcoat Prepolymer-thickness: 80 Å
Composition: as in Example 2
Baking temperature: 120° C.

| Baking time (hrs) | Continuous start/stop Number of Cycles |
|---|---|
| 1 | 20,200 |
| 2 | 25,300 |
| 4 | 28,000 |
| 8 | 27,300 |
| 16 | 28,500 |

The superior results obtained in Test 2 are readily apparent.

EXAMPLE 5

In this test the static and dynamic friction coefficients were determined on metal-plated 5.25" discs (rigid) in which the magnetic layer consists of a Co/Ni or a Co/Ni/P alloy.

The fluorinated polyurethane used for the purpose was the composition of Example 2, applied by means of dip-coating techniques, starting from dilute solutions so as to obtain a thickness of 80Å.

The coefficient of friction (C.O.F.) was measured after a short contact period, by determining the tangential force necessary for obtaining motion of the head, by means of a suitable load-measuring cell, a signal conditioner, and a potentiometric recorder. The results of the test were as follows:

Case 1: Overcoat: Z DISOC-thickness: 80Å (as in Example 4)
Crosslinking at: 120° C. for 8 hours

| Static C.O.F. | Dynamic C.O.F. |
|---|---|
| 0.43 | 0.38 |

Case 2: Overcoat: prepolymer -thickness: 80Å
Composition: as in Examole 2

| Static C.O.F. | Dynamic C.O.F. |
|---|---|
| 0.30 | 0.25 |

Example 6

In this example, fluorinated polyurethane overcoat layers were deposited on floppy discs, in which the magnetic layer consisted of —$Fe_2O_3$ dispersed in a plastic polyurethane matrix.

The prepolymer of Example 1 was deposited starting from solutions diluted to 1% (concentration=10 g/liter) as described in Example 1, by a dip-coating technique, at such an extraction speed as to obtain a thickness of 200Å.

On the test pieces thus treated there was determined the value of the contact angle of the reference fluids, in order to determine the characteristics of the resulting surfaces.

The contact angle was also determined after washing with excess isopropane solvent for 5 minutes at 20° C., in order to verify the adhesion characteristics of the coating.

Case 1: Overcoat: Z DISCO-thickness: 200Å (as in Example 4)
Baking at 150° C. for 1 hr. (to effect crosslinking)
Reference fluid: distilled $H_2O$

| | CONTACT ANGLE | | | | |
|---|---|---|---|---|---|
| Without overcoating | | After overcoating (not crosslinked) | | After overcoating (crosslinked) | |
| Initial | After washing | Initial | After Washing | Initial | After Washing* |
| 80° | ** | 90° | 80° | 89° | 79° |

*Washing carried out with isopropanol
**Value of about 72°, which is not significant, however, inasmuch as a partial removal of the substrate is observed.

Case 2: Overcoat with the composition of Example 1
Reference fluid: distilled $H_2O$

| CONTACT ANGLE | | | |
|---|---|---|---|
| After Overcoating (not crosslinked) | | After Overcoating (crosslinked) | |
| Initial | After Washing with isopropanol | Initial | After Washing with isopropanol |
| 113° | 90° | 113° | 105° |

On the same materials the friction coefficients were determined with the method described in the preceding examples. The results were as follows:
Case 1: Overcoat: only Z DISOC-thickness: 200Å (as in Example 4)
Baking: at 150° C. for 1 hour

| C.O.F. (attrition-friction coefficient) | |
|---|---|
| Static | Dynamic |
| 0.35 | 0.32 |

Case 2: Overcoat: composition as in Example 1
Baking: at 80° C. for 8 hours-thickness: 200Å

| C.O.F. (friction coefficient) | |
|---|---|
| Static | Dynamic |
| 0.27 | 0.22 |

EXAMPLE 7

On floppy discs with a polyurethane binder of the type of Example 5, the contact angles of various different reference fluids were determined before and after washing with a solvent (isopropanol) in order to determine the resistance of the overcoat to the treatment with solvents.

The composition of the fluorinated overcoat was that of Example 2, and the thickness was 120Å. Baking was carried out at a temperature of 100° C. for 4 hours. The results are shown in Table 3.

TABLE 3

| | Contact Angle | | | |
|---|---|---|---|---|
| | With Crosslinked Overcoat | | Without Crosslinked Overcoat | |
| Reference Fluid | Before Washing | After Washing* | Before Washing | After Washing |
| Distilled water | 116° | 115° | 80° | 72° |
| Nitromethane | 70° | 70° | 6°** | 10° |
| Methanol | 37° | n.d. | 1°** | (a) |
| Acetone | 25° | n.d. | 1°** | (a) |
| Methylene iodide | 110° | n.d. | 27° | (a) |

(a) Alteration of the substrate was observed.
*Washing carried out with isopropanol.
**The reference fluid exerts a dissolving action on the substrate as such.
n.d. Not determined

What is claimed is:

1. A process for the protection and lubrication of a megnetic recording medium surface subjected to friction and wear comprising coating directly said surface with a layer comprising a polyurethane containing polyoxyfluoroalkylene blocks, said blocks comprising repeating fluoropolyoxyalkylene units of the following classes:

(I) ($C_2F_4O$), ($CF_2O$), said units being randomly distributed along the fluoropolyoxyalkylene chain;

(II) ($C_3F_6O$), ($C_2F_4O$), (CFXO) wherein X is —F or —$CF_3$, said units being radomly distributed along the fluoropolyoxyalkylene chain;

(III) —$CH_2$—$CF_2$—$CF_2$—O—;

(IV) —$CF_2$—$CF_2$—$CF_2$—O—; or $$\left( CFCF_2O \atop CF_3 \right) \quad (V)$$

2. The process of claim 1, wherein the fluoropolyoxyalkylene units of said classes are the following:

(I) $(C_2F_4O)$ $(CF_2O)$; or $(C_2F_4O)$;

(II) $(C_3F_6O)$ $(C_2F_4O)$ $(CFXO)$ wherein X is —F or —$CF_3$; or $(C_3F_6O)$ $(CFXO)$; or $(C_3F_6O)$;

(III) —$CH_2$—$CF_2$—$CF_2$—O—; said units being linked to one another as shown by the following structural formula:

—(O—$CF_2$—$CF_2$—$CH_2)_p$—O—R'$_f$—O—(C-$H_2$—$CF_2$—$CF_2O)_q$— wherein R'$_f$ is a fluoroalkylene group, p and q are integers from 0 to 200 and p+q is at least 1:

(IV) —$CF_2CF_2$—$CF_2O$—; or $$\begin{matrix} CFCF_2O; \\ | \\ CF_3 \end{matrix} \quad (V)$$

said units being linked to one another as shown in the following formula:

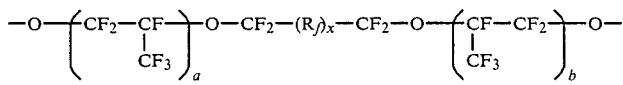

wherein R$_f$ is a fluoroalkylene group, x is 0 or 1, a and b are intergers, with a+b being at least 1.

3. The process of claim 1 wherein the polyurethane is obtained by reacting one or more diisocyanates of the following classes:

(a) a fluorinated diisocyanate containing fluoropolyoxyalkylene units of Classes I, II, III, IV or V and having a mean molecular weight of from about 500 to 7000;

(b) a non-fluorinated diisocyanate represented by the formula:

OCN—R—NOC wherein R is a bivalent aliphatic radical having from 1 to 12 carbon atoms, a bivalent cycloaliphatic radical, or bivalent aromatic radical;

with one or more diols of the following classes:

(c) a fluorinated or non-fluorinated diol containing one or more aromatic, cycloaliphatic or polycyclic rings;

(d) a polyoxyfluoroalkylene having —$CH_2OH$ terminal groups, said polyoxyfluoroalkylene of Classes I, II, III, IV or V and having a mean molecular weight of from about 400 to 7000;

(e) non-fluorinated diols of the formula HO—R—OH, wherein R is as previously defined.

4. The process of claim 3 wherein the polyurethane is

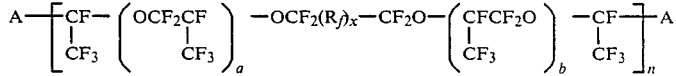

crosslinked with one of the following compounds:

(f$_1$) a trihydroxy- or tetrahydroxy-polyoxy-fluoroalkylene having a fluoropolyoxyalklene chain of Classes I, II, III, IV or V and having a hydroxy terminal group at each end, at least one of said terminal groups being a dihydroxy terminal;

(f$_2$) a hydrogenated or fluorinated compound having at least three terminal hydroxy groups, said compound being an aliphatic aromatic, or polycyclic compound;

(g) a polyisocyanate that is a trimer or polymer of the isocyanate (b) of claim 3;

provided that the compound used for crosslinking does not contain fluorooxyalkylene units if the polyurethane contains said units, and that the crosslinking compound does contain said fluorooxyalkylene units when the polyurethane does not contain said units.

5. The process of claim 4 wherein the polyurethane is obtained by reacting a diisocyanate and a diol, each free of polyoxyfluoroalkylene units, with a crosslinking agent containing polyoxyfluoroalkylene units.

6. The process of claim 3 wherein said fluorinated diisocyanate is a diisocyanate of the formula:

OCN—R—(Z)$_d$—$CF_2O(C_2F_4O)_m$—$(CF_2)_n$—$CF_2$—(Z)$_d$—R—NCO wherein d is 0 or 1, m and n are positive integers so selected that the molecular weight is as defined in claim 3, Z is a bivalent linking radical, R is a bivalent aliphatic radical having from 1 to 12 carbon atoms, a bivalent cycloaliphatic radical or a bivalent aromatic radical, and wherein the $(CF_2O)$ and $(C_2F_4O)$ units are randomly distributed along the chain.

7. The process of claim 3 wherein said fluorinated diisocyanate is a diisocyanate of the formula:

OCN—R—(Z)$_d$—$(C_3F_6O)_r$—$(C_2F_4O)_s$—$(CFXO)_t$—(Z)$_d$—R—NCO wherein X=F or —$CF_3$; d, Z and R are as previously defined, r, s and t are positive integers so selected that the molecular weight is as defined in claim 3, and wherein the $(C_3F_6O)$, $(C_2F_4O)$ and $(CFXO)$ units are randomly distributed along the chain.

8. The proces of claim 3 wherein said fluorinated diisocyanate is a diisocyanate of the formula:

B—$CF_2CH_2(OCF_2CF_2CH_2)_p$—OR'$_f$—O—$(CH_2CF_2CF_2O)_q CH_2CF_2$—B wherein p and q are positive integers so selected that the molecular weight is as defined in claim 3, R'$_f$ is a fluoroalkylene radical, and the B group contains —NCO terminal.

9. The process of claim 3 wherein said fluorinated diisocyanate is a diisocyanate of the formula:

10. A process of claim 3 wherein said fluorinated or non-fluorinated diol is a diol of the formula:

14. The process of claim 3 wherein component (d) is a diol of the formula:

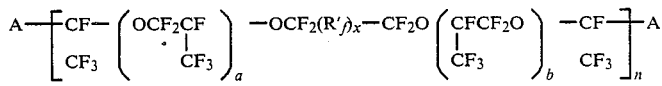

wherein A is a group containing a terminal —OH; and a, b, n, $R_f$ and x are each as defined in claim 9.

15. The process of claim 4 wherein the crosslinking agent is

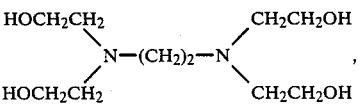

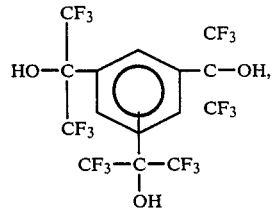

a trimer of hexamethylenediisocyanate, or a trimer of toluenediisocyanate.

16. The process of claim 1 wherein said coating is carried out by preparing two separate solutions, a first solution containing a prepolymer having isocyanate or hydroxy terminals, said prepolymer being dissolved in a solvent, the second solution containing the crosslinking agent dissolved in a solvent, applying to said surface said first solution, thereafter applying said second solution, thereafter evaporating the solvents and heating at a temperature of from about 20° C. to 150° C.

17. The process of claim 1 wherein said coating is carried out by preparing a single solution comprising a trimerization catalyst and a prepolymer having isocyanate terminal groups in a solvent, applying said solution onto the surface, thereafter evaporating the solvent, and heating at a temperature of from about 100° C. to 150° C.

18. A rigid magnetic recording disk, the surface of which is lubricated and protected according to the process of claim 1.

19. Magentic recording media comprising a flexible backing and magnetizable layer, said layer having a lubricating and protecting coating according to the process of claim 1.

20. A magnetic recording tape, the surface of which is lubricated and protected according to the process of claim 1.

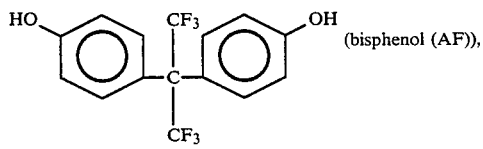
(bisphenol (AF)),

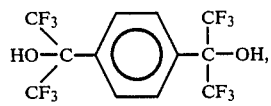

or

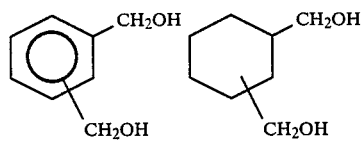

11. The process of claim 3 wherein said polyoxyflouroalkylene is a diol of the formula:

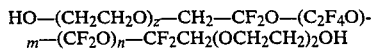

wherein z is a number from 0 to 3, m and n are positive integers so selected that the molecular weight is as defined in claim 3, and the ($C_2F_4O$) and ($CF_2O$) units are randomly distributed along the chain.

12. The process of claim 3 wherein said polyoxyfluroalkylene is a diol of the formula:

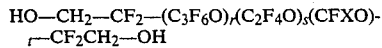

wherein X is —F or —$CF_3$; r, s and t, are positive integers so selected that the average molecular weight is as defined in claim 3, and the units ($C_3F_6O$), ($C_2F_4O$) and (CFXO) are randomly distributed along the chain.

13. The process of claim 3 wherein said polyoxyfluoroalkylene is a diol of the formula:

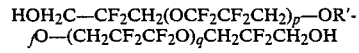

wherein p, q and $R'_f$ are each as defined in claim 8.

UNITED STATES PATENT AND TRADEMARK OFFICE
CERTIFICATE OF CORRECTION

PATENT NO. : 4,842,939   Page 1 of 4
DATED : June 27, 1989
INVENTOR(S) : Mario A. Scarati et al.

It is certified that error appears in the above-identified patent and that said Letters Patent is hereby corrected as shown below:

Column 1, line 67: Change "flexibilty" to --flexibility--
Column 2, line 48: Change "X=F" to --X=-F--
Column 2, line 49: Change "fluoropolyoxalkylene" to --fluoropolyoxyalkylene--.

Column 2, line 68: Change "; or $(C_3F_6)$;" to --$(CFXO)$; or $(C_3F_6O)$;--

Column 3, line 32: Change "intergers" to --integers--
Column 3, line 1: Change "said units said units" to --said units--

Column 3, line 40: Change "form" to --from--
Column 4, Top right diagram: Change

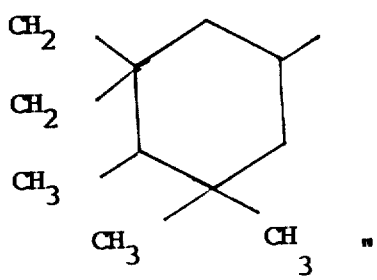

to:

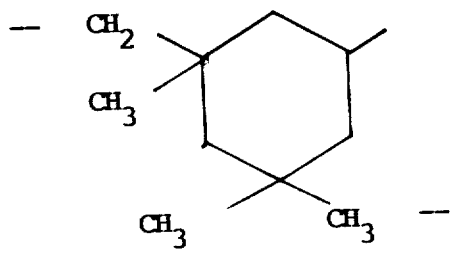

UNITED STATES PATENT AND TRADEMARK OFFICE
CERTIFICATE OF CORRECTION

PATENT NO. : 4,842,939    Page 2 of 4

DATED : June 27, 1989

INVENTOR(S) : Mario A. Scarati et al.

It is certified that error appears in the above-identified patent and that said Letters Patent is hereby corrected as shown below:

```
Column 4, lines 29-30:  Change "respesented" to --represented--
Column 4, line 45:      Change "3,847,987" to --3,847,978--
Column 4, line 57:      Change "3,847,987" to --3,847,978--
Column 5, line 11:      Change "Non-fluorinate" to
                        --Non-fluorinated--.

Column 5, line 50:      Change "and average" to --an average--
Column 6, line 34:      Change "Flourinated" to --Fluorinated--.
Column 7, line 8:       Change "(F₂)" to --(F₁)--
Column 7, line 9:       Change "fluoropolyoxyalkiene" to
                        --fluoropolyoxyalkylene--

Column 7, line 44:      Change "(a)" to --(b)--
Column 7, line 46:      Change "toluenediisocyante" to
                        --toluenediisocyanate--.

Column 8, line 7:       After "will be" add --a--
Column 8, line 15:      Change "corosslinked" to --crosslinked--
Column 8, line 25:      Change "premit" to --permit--
Column 9, line 30:      After "Fe₂O₃," insert --CrO₂,--
Column 10, line 43:     Change "1012,5" to --1012.5--
Column 10, line 64:     Change "g-liter" to --g/liter--
Column 11, line 7:      Change "hunderd" to --hundred--
Column 11, line 48:     Change "disc-reading-recording" to
                        --disc-reading/recording--

Column 13, line 12:     Change "Examole" to --Example--
Column 14, line 48:     Change "megnetic" to --magnetic--
Column 14, lines 54-55: Change "disributed" to --distributed--
```

UNITED STATES PATENT AND TRADEMARK OFFICE
CERTIFICATE OF CORRECTION

PATENT NO. : 4,842,939           Page 3 of 4

DATED : June 27, 1989

INVENTOR(S) : Mario A. Scarati et al.

It is certified that error appears in the above-identified patent and that said Letters Patent is hereby corrected as shown below:

Column 14, line 57: Change "radomly" to --randomly--
Column 14, line 60: Change "(IV)-$CF_2$-$CF_2$-$CF_2$-O-; or" to
 --(IV)-$CF_2$-$CF_2$-$CF_2$O-; or--

Column 15, line 13: Change "(IV)-$CF_2CF_2$-$CF_2$O-; or" to
 --(IV)-$CF_2$-$CF_2$-$CF_2$O-; or--

Column 15, line 28: Change "intergers" to --integers--
Column 15, line 38: Change "OCN-R-NOC" to --OCN-R-NCO--

Column 15, line 63: Change "fluoropolyoxyalkiene" to
 --fluoropolyoxyalkylene--

Column 16, line 17: Change: "OCN-R-$(Z)_d$-$CF_2$O$(C_2F_4O)_m$-
 $(CF_2)_n$-$CF_2$-$(Z)_d$-R-NCO"
 to
 --OCN-R-$(Z)_d$-$CF_2$O$(C_2F_4O)$-
 $(CF_2O)_n$-$CF_2$-$(Z)_d$-R-NCO--

Column 16, line 38: Change "X=F" to --X=-F--
Column 16, line 43: Change "proces" to --process--
Column 17, line 30: Change "polyoxyflouroalkylene" to
 --polyoxyfluoroalkylene--

Column 17, lines 40-41: Change "polyoxyfluroalkylene" to
 --polyoxyfluoroalkylene--

UNITED STATES PATENT AND TRADEMARK OFFICE
CERTIFICATE OF CORRECTION

PATENT NO. : 4,842,939

DATED : June 27, 1989

INVENTOR(S) : Mario A. Scarati et al.

It is certified that error appears in the above-identified patent and that said Letters Patent is hereby corrected as shown below:

Column 17, lines 42-43: Change "$HO-CH_2-CF_2-(C_3F_6O)_r-(C_2F_4O)_s(CFXO)_t-CF_2CH_2-OH$"
to
--$HO-CH_2-CF_2-(C_3F_6O)_r-(C_2F_4O)_s(CFXO)_t-CF_2-CH_2-OH$--

Column 18, line 48: Change "Magentic" to --Magnetic--

Signed and Sealed this

Tenth Day of March, 1992

Attest:

HARRY F. MANBECK, JR.

*Attesting Officer*  *Commissioner of Patents and Trademarks*